United States Patent [19]

Beatty

[11] 4,251,602

[45] Feb. 17, 1981

[54] HIGH PRESSURE SAFETY VENT FOR GALVANIC DRY CELLS

[75] Inventor: Theodore R. Beatty, Bay Village, Ohio

[73] Assignee: Union Carbide Corporation, New York, N.Y.

[21] Appl. No.: 130,263

[22] Filed: Mar. 14, 1980

[51] Int. Cl.³ .............................................. H01M 2/12
[52] U.S. Cl. ......................................... 429/54; 429/56
[58] Field of Search .............................. 429/54, 56, 53

[56] References Cited

U.S. PATENT DOCUMENTS

| 2,881,368 | 4/1959 | Hancock | 429/54 |
| 3,219,488 | 11/1965 | Southworth | 429/56 |
| 3,256,117 | 6/1966 | Howatt et al. | 429/54 |
| 3,355,329 | 11/1967 | Wilke et al. | 429/54 |
| 3,884,722 | 5/1975 | Tucholski | 429/54 |
| 4,020,241 | 4/1977 | Heinz | 429/54 |
| 4,063,902 | 12/1977 | Heinz | 29/623.2 |
| 4,079,172 | 3/1978 | Potts et al. | 429/54 |

Primary Examiner—Donald L. Walton
Attorney, Agent, or Firm—Cornelius F. O'Brien

[57] ABSTRACT

Radially sealed galvanic dry cells having a safety high pressure vent means comprising the crimping of an arc portion between about 150° and 200° of the top edge of the container over the cell's gasket-cover closure means so that at a predetermined high internal gas pressure build up, the gas will tip the cover of the closure means and produce a vent passage within the cell housing between the cover and the gasket of the closure means proximal the remaining arc portion of the top edge of the container.

9 Claims, 6 Drawing Figures

HIGH PRESSURE SAFETY VENT FOR GALVANIC DRY CELLS

FIELD OF THE INVENTION

This invention relates to radially sealed galvanic cells, and more particularly to a high pressure venting means for releasing high excessive gas pressure from inside the cells.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it generally is resealable in order to avoid drying out of the electrolyte over the life of the cell and to prevent ingress of oxygen from the atmosphere which can cause wasteful corrosion of the anode.

In the past several different types of resealable pressure relief vent valves have been used for releasing high internal gas pressures from inside a sealed galvanic cell. One type of valve that has been commonly used consists basically of a valve member, such as a flat rubber gasket, which is biased into sealing position over a vent orifice by means of a resilient member, such as a helical spring. The resilient member or spring is designed to yield at a certain predetermined internal gas pressure so as to momentarily relieve the seal and allow the gas to escape through the vent orifice.

Another type of resealable vent is disclosed in U.S. Pat. No. 3,415,690 to Richman issued on Dec. 10, 1968. In this vent, a flat elastomeric seal gasket overlies the vent opening and is retained in place by a resilient terminal cap on the top of the cell. This vent operates in generally the same manner as the vent previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momentarily break the seal and allow gas to escape through the vent orifice.

A major problem encountered with resealable pressure relief vent valves of the types just described is that they are bulky and/or difficult to incorporate into the cell assembly. Furthermore, these pressure relief vent valves are expensive to manufacture and most are not adaptable for incorporation into miniature size cells. In addition, some of the prior art resealable vents as exemplified by the foregoing patents are not suitable for low pressure venting.

Alternatives to high pressure resealable vent means are fail safe venting systems as illustrated in U.S. Pat. Nos. 3,218,197 and 3,314,824. Specifically in the U.S. Pat. No. 3,128,197 patent a venting means is disclosed in which the seal gasket has a thin section that will rupture or "blow-out" at a predetermined high pressure buildup within the cell. The difficulty with this type of venting means is that for small diameter cells it is difficult to obtain consistency in the thickness of the "blow-out" section of the gasket using conventional manufacturing techniques. In the U.S. Pat. No. 3,314,824 patent a puncture-type safety seal is disclosed which comprises a spring washer positioned within the cell's seal assembly and a radially acting toothed puncture washer. The teeth of the washer slide relative to the spring washer when the spring washer is subjected to internal pressure so that at a predetermined gas pressure buildup, the teeth of the washer will puncture the seal's gasket thereby providing a vent passage. This type of venting means requires several component parts, is rather expensive to make and assemble, and is not suitable for small diameter cells.

An inexpensive low pressure resealed vent closure is disclosed in U.S. Pat. Nos. 4,020,241 and 4,063,902 filed in the name of Henry Heinz, Jr. Specifically, a galvanic cell is disclosed having a resealable vent closure consisting of a resilient elastomeric sponge gasket disposed and compressed between the cover of the cell and the upper wall of the cell's container and designed to vent low pressure gas buildup along the cover-gasket interface and/or container-gasket interface.

U.S. Pat. No. 4,079,172 discloses sealed galvanic dry cells having at least one gas venting passage disposed at the interface of the top surface of the cover and the curled over rim of the container. The passage is defined as being a recess in the cover disposed below the curled over rim and/or a notch in a portion of the curled over rim.

As discussed above, resealable, high pressure relief vent valves are generally bulky and/or difficult to incorporate into a cell assembly, blow-out type safety vents are not suitable for small cell applications, while low pressure vent means for some cell systems may not adequately and sufficiently prevent loss of electrolyte through leakage or prevent ingress of oxygen from the atmosphere which could cause wasteful corrosion of the anode.

It is, therefore, an important object of this invention to provide a compact and economical high pressure vent for use in galvanic cells.

Still another object of this invention is to provide a high pressure vent for galvanic cells which requires a small number of parts and which is, therefore, easy to assemble and inexpensive to manufacture.

Another object of this invention is directed to a galvanic cell in which a first arc portion between about 150° and 200° of the top peripheral edge of the container is turned or curled over the container's gasket-cover closure means so that when a predetermined high gas pressure build up develops in the cell, the gas will pass through an orifice in the gasket and cause the rigid cover of the closure means to tip or tilt about the diametral axis formed between the first arc portion and the remaining second arc portion so as to produce a vent passage at the interface of the cover and the gasket of the closure means proximal the remaining second arc portion of the top peripheral edge of the container.

The foregoing and additional objects will become more fully apparent from the following description and the accompanying drawings.

SUMMARY OF THE INVENTION

The invention relates to a galvanic cell comprising a container having an open end and an inner disposed active anode, an active cathode, and an electrolyte disposed within said container; a closure means for the container, said closure means comprising an annular rigid cover disposed within a first annular di-electric gasket having a U-shaped type cross section with the center of the di-electric gasket defining an opening; a current collector disposed through the central opening in the first di-electric gasket and contacting an active member of the cell; the container having a segment of its upper wall radially compressed against said cover via said first di-electric gasket providing a seal thereat; preferably the raw cell is encased in a housing comprising an insulating tubular sleeve enclosing said container and closure means and being axially longer than said container and closure means; a first circular conductive member electronically contacting the bottom of the container and whereby the bottom peripheral edge of the sleeve is curled over said first conductive member thereby adapting said first conductive member as a first terminal of the cell; a second di-electric gasket disposed on the top edge of the container at the open end; a second circular conductive member electronically contacting the current collector and insulated from the container by said second di-electric gasket and whereby the top peripheral edge of the sleeve is curled over said second conductive member thereby adapting said second conductive member as a second terminal of the cell; the improvement wherein a first arc portion between about 150° and 200° of the top peripheral edge of the container defining the open end is curled over the first di-electric gasket thereby axially securing the closure means at said first arc portion within the container; wherein at least one vent opening is disposed in the first di-electric gasket below the cover; and wherein the second gasket, when employed, is disposed over the first gasket by an amount sufficient to enable the cover to tip upwardly at the remaining second arc portion of the top of the container after internal gas has reached a predetermined pressure level thereby venting gas between the cover and the first gasket.

In conventional type galvanic cells, the upper wall of the container is sealed to the cover of the cell using a radial and/or crimped sealing technique. In Leclanche, zinc chloride or other galvanic cells, there is usually a tendency to have gas build up within the cell during storage and/or use. As stated above, in designing a cell with a low pressure venting system, although the gas will have a means for venting to the atmosphere, there is a tendency that air from the atmosphere may possibly leak into the cell, thus causing corrosion of the anode. In addition, in low pressure venting systems, there is also a tendency for the electrolyte to creep or leak from the cell which could cause damage to the instrument or device in which the cell is incorporated. To provide an improved seal for the cells, it has been found that an application of a sealant such as grease or asphalt can be applied to the interface of the upper portion of the inner container wall and the closure means. This effectively seals the cells against low pressure leakage of electrolyte while simultaneously preventing premature drying out of the liquid components of the cells.

It has been found that when the complete upper extremity of the container wall is turned over and onto the cover of the cell using conventional techniques, the seal obtained through the use of the sealant in combination with conventional radial and/or crimping sealing techniques is very effective. However, with the build up of gas within the cell, the container wall may expand to relax the radial seal and the closure means is urged axially upward thereby securing and sealing the closure means of the cell to the upper turned over portion of the container wall, thus blocking any path for the gas to escape. As a result, with the increase of pressure buildup within the cell, the seal may become more effective against gas leakage. Although this sounds desirable, it has the effect that under abuse conditions, such as charging or high temperature environment, the gas pressure could continue to build up until it reaches a level where the cover may project from the cell. This abusive use of the cell could damage the device in which the cell is used.

The cell of this invention is encased in an outer cell jacket with an appropriate terminal disc at each end in a conventional manner. Any projection of the closure means from the cell could distort the jacket and/or terminal discs to a degree where the cell could possibly get lodged in the device in which it is assembled. In addition, any projecting of component parts out of the cell is usually accompanied by a relatively loud noise that could upset or even frighten the individual or individuals in close proximity to the device containing the cell. To prevent the possibility of such damage or noise from the release of high pressure buildup within a cell, the present invention is directed to a unique high pressure relief means that permits the cover of the closure means to tip or tilt about the diametral axis of the container after a predetermined high pressure buildup. This will prevent the closure means or any portion thereof from being completely projected out of the cell and at the same time effectively eliminate the noise usually accompanied by the projecting of component parts from a cell.

In the preferred embodiment of this invention, the first arc portion of the top peripheral edge of the container that is curled over the closure means should be between about 170° and about 180° with about 180° being the most preferable. The cell's closure means comprises a cover-gasket combination and since the cell is encased in an outer jacket that is curled or crimped over conductor terminal discs disposed at opposite ends of the cell, the gasket member which contacts the cell's container will generally be axially secured by the jacket and terminal disc. Thus, the gasket must be provided with at least one orifice below the cover so that the gas within the container can contact the cover directly. By axially securing the closure means to the open end of the container by curling an arc portion between about 150° and 200° of the top peripheral edge of the container over the closure means, the remaining arc portion of the peripheral edge of the container will not provide the same degree of axial restraint for the cover of the closure means. The radial seal provided by radially compressing an annular segment of the wall of the container against the closure means will provide an admirable seal against low pressure build up within the cell. The cover of the closure means of this invention is axially secured at a portion of its peripheral segment so that after a predetermined high gas pressure build up within the cell is developed, the force of the gas will tip or tilt the cover about the diametral axis of the container whereby a portion of the periphery of the cover remains substantially secured while a vent passage is formed between the cover and gasket of the closure means at the portion of the periphery of the cover that was not fully axially secured by the container. Thus the gas passes through the orifice in the gasket, tilts the cover and vents through the passage at the interface of the gasket and cover and out between the interface of the jacket and conductive disc at the curled over segment of the jacket. Any electrolyte leakage will be maintained within the space between the closure means and conductive disc and/or the space between the cover and gasket. Thus using the teachings of this invention, galvanic cells can be provided with an economical and reliable sealing and venting means without the addition of any new component parts.

Since the cover is tipped while the gasket of the cell's closure means remains relatively secured, then the upper edge of the container forming the remaining arc portion may be curled slightly over the gasket as long as it does not obstruct or prevent the cover from tipping upwardly. However, it is necessary that the first arc portion of the container that is curled over to axially retain the closure means be extended sufficiently to insure that when a predetermined level of internal gas pressure is developed, it will tip or tilt the cover about the diametral axis of the container in which the cover remains substantially secured at the first arc portion while a vent passage is formed between the cover and the gasket at the remaining arc portion. This will prevent any projection of component parts out of the cell due to high internal pressure buildup.

The present invention will become more apparent from the following description thereof when considered together with the accompanying drawing which is set forth as being exemplary of the embodiments of the present invention and is not intended in any way to be limitative thereof and wherein.

Figure 1:
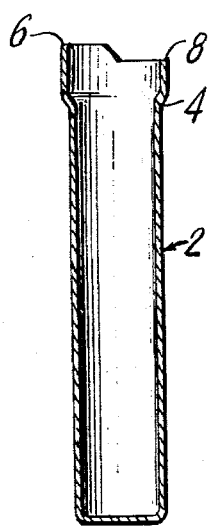
FIG. 1 is a sectional elevation taken through a container for use in this invention.
Figure 2:
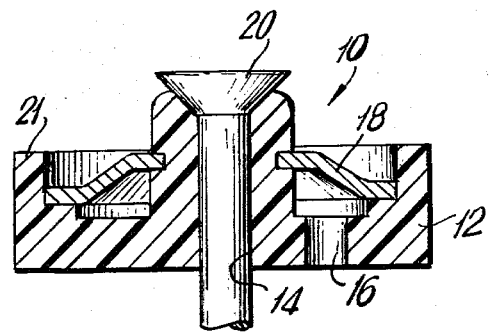
FIG. 2 is a sectional elevation taken through a closure means for use in this invention.

Referring in detail to FIGS. 1 to 4, there is shown a cylindrical cupped container 2 made of a material such as steel and having an expanded top portion which provides an annular flange with shoulder 4. A 180° arc portion 6 of the top peripheral edge of the container 2 is extended above the remaining 180° arc portion 8. In FIG. 2 a closure means 10 is shown comprising an annular U-shaped gasket 12 of a material such as hard dielectric plastic. The gasket 12 has a central aperture 14 and a vent orifice 16. An annular apertured metallic cover 18 is recessed in the U-shaped gasket 12 and a conductive anode collector rod or pin 20, made of a material such as brass, passes through the center apertures in gasket 12 and cover 18. The peripheral skirt 21 or gasket 12 extends above cover 18.

Figure 3:
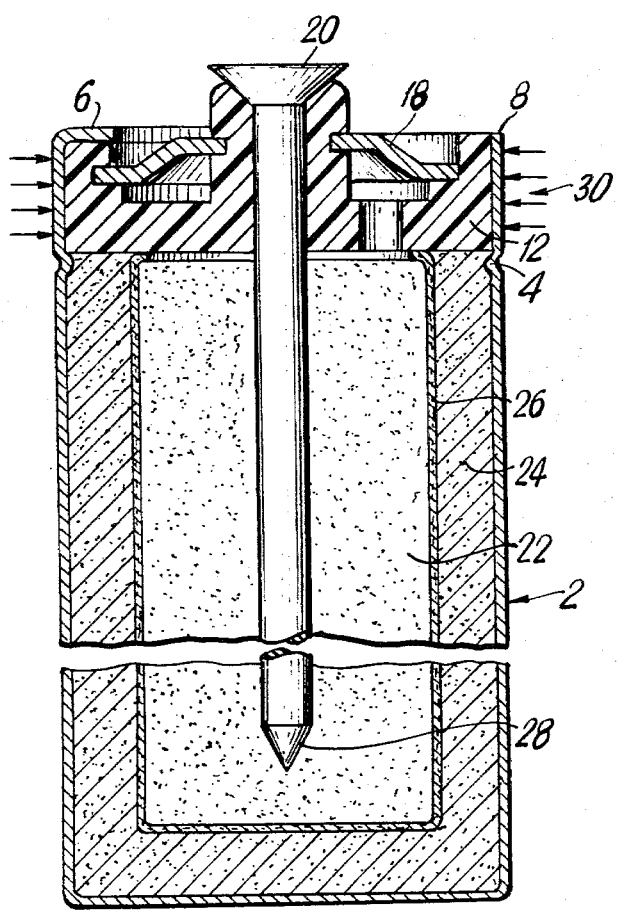
FIG. 3 is a sectional elevation of the container of FIG. 1 and the closure means of FIG. 2 shown assembled in a raw galvanic cell in accordance with this invention.
Figure 4:
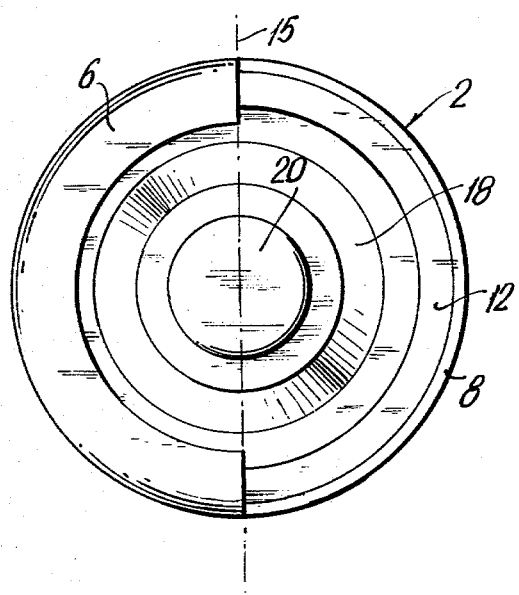
FIG. 4 is a top plan of FIG. 3.

FIGS. 3 and 4 show an assembled alkaline manganese dioxide-zinc raw cell comprising container 2 having disposed therein an anode mix 22 and cathode 24 separated by a separator 26. The anode mix 22 could comprise particulated zinc with a gelling agent and an electrolyte such as aqueous potassium hydroxide. The cathode could comprise manganese dioxide and a conductive material such as graphite. As shown in FIG. 3, the closure means 10 of FIG. 2 is positioned within the open end of the container where the gasket 12 rests on at least shoulder 4. If desired a layer of sealant may be disposed at the interface of the gasket and the flange of the container. Upon inserting closure means 12 in container 2, anode collector rod 20 having a tapered end 20 is forced into anode mix 22 to make good contact therewith. Once the closure means 12 is seated within container 2, the annular segment 30 of container 2 is radially compressed against the gasket-cover-rod members thereby radially sealing the closure means 10 in the container as per the teaching of U.S. Pat. No. 3,069,489 which is incorporated herein by reference. The anode collector 20 is radially sealed in the closure means 10 per the teaching of U.S. Pat. No. 3,042,734 which is incorporated herein by reference. Specifically, this is accomplished by driving the tapered anode collector 20 through aperture 14 provided in gasket 12 with the cover 18 in place. The anode collector 20 is deliberately of a slightly large diameter than the aperture 14 in gasket 12, so that when the tapered anode collector 20 is driven through the aperture 14 in gasket 12, the gasket 12 is radially compressed between the cover 18 and the anode collector 20, thereby furnishing an extremely tight mechanical seal at this area.

After the closure means 10 is radially sealed in container 2, the arc portion 6 is curled and compressed over gasket 12 thereby axially retaining the closure means 10 within the container 2.

Figure 5:
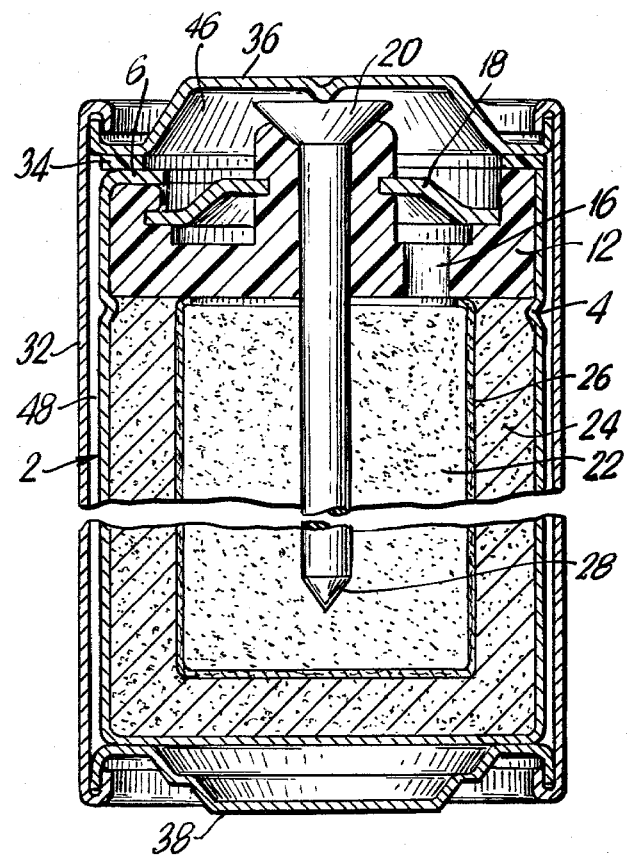
FIG. 5 is a sectional elevation of the raw galvanic cell of FIG. 3 encased in an outer jacket to provide a finished cell.

As shown in FIG. 5, after the cell's container 2 has been sealed with closure means 10, the cell is encased in an insulated tubular jacket 32 (e.g., steel with an insulating paper liner) and an insulating annular gasket 34 is positioned over the peripheral edge of gasket 12 and the top wall of container 2. The width of gasket 34 is sufficient to overlap container 2 and gasket 12 but not cover 18 in the arc segment area defined by arc portion 8 of container 2. This is necessary to prevent an obstruction in the path of the cover 18 as its tips or tilts under a predetermined high level internal gas pressure buildup. An external circular conductive disc 36, which is in contact with anode collector 20 and insulated from container 2, is provided across the top open end of the cell jacket 32. The top edge of jacket 32 is then curled or crimped over the peripheral edge of conductive disc 36 securing the disc 36 to the cell but not providing a seal against high pressure gas buildup. Conductive disc 36 is thereby adapted as the polarized terminal for the anode 22. In a like manner, an external conductive annular disc 38, which is in contact with container 2, is provided across the bottom open end of the cell jacket 32. The bottom edge of jacket 32 is then curled or crimped over the peripheral edge of conductive disc 38 securing the disc 38 to the cell. Conductive disc 38 is thereby adapted as the polarized terminal for the cathode 24.

Figure 6:
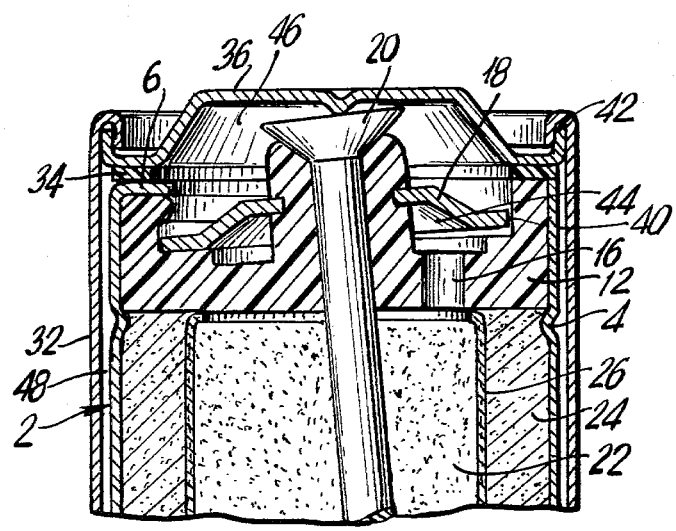
FIG. 6 is a sectional elevation of the fully assembled cell of FIG. 5 after the cover of the closure means has been tipped or tilted to provide a vent passage through which gas buildup within the cell can escape.

As shown in FIG. 6, after a predetermined high internal pressure is developed, the pressure will act against cover 18 through aperture 16 in gasket 12 and cause cover 18 to tip or tilt about the diametral axis 15 (FIG.

4) of the container thereby producing a vent passage 40 between cover 18 and gasket 12 of closure means 10 at the arc portion 8 of the container. The internal gas buildup will vent through orifice 16, vent passage 40 and escape to the atmosphere at the interface of the conductive disc 36 and jacket 32 at the curled over area 42. Any electrolyte escaping from within the cell will become trapped within the space 44 disposed between cover 18 and gasket 12 and/or space 46 between closure means 10 and conductive disc 36. If desired, a passage could be provided to the annular space 48 between container 2 and jacket 32 for accommodating any electrolyte escaping from the cell. This high pressure venting means will provide an excellent vent for high pressure gas from within the cell while maintaining any escaping electrolyte within the cell. This will effectively or substantially eliminate any external distortion of the finished cell due to high internal pressure buildup.

As discussed above, the top edge 8 of container 2 could be slightly curled over gasket 12 by an amount insufficient to impede or obstruct cover 18 from tipping or tilting as generally shown in FIG. 6. This would be particularly advantageous when producing a raw cell in accordance with this invention.

It is to be understood that the level of internal pressure required to tip or tilt the cover of the closure means can vary over a range of about 400–1000 psi depending on the tightness of the radial seal.

EXAMPLE

A plurality of 0.52 inch diameter cylindrical raw cells was produced as shown in FIG. 3 employing a manganese dioxide-containing cathode, a zinc-containing anode and a potassium hydroxide-containing electrolyte. The closure means used is shown in FIG. 2 and comprised a brass anode collector rod, a plastic gasket and a steel cover. Several lots of raw cells were subjected to abusive testing by charging the cell under various currents as shown in Table I. The average time for the cells in each lot to vent under this abusive testing in shown in Table I. It was observed that in each of the cells tested, the cover tipped or tilted about the diametral axis of the container after a high pressure level was developed in the cell whereupon the gas escaped between the cover and the gasket proximate the peripheral edge of the container that was not curled over the cover. This demonstrated the safety venting means of this invention whereupon high gas pressure was vented without any of the cell's component parts being projected completely out of the cell's container. In each of the cells tested, the closure means remained an integral part of the cell by being secured at the peripheral edge of the container that was curled over the closure means. This test clearly demonstrated the safety aspects of this invention wherein high pressure gas levels are developed in cylindrical cells.

TABLE I

| Charge Current (ampere) | No. of Cells/Lot | Average time to vent |
| --- | --- | --- |
| 0.1 | 3 | 15 minutes |
| 0.25 | 3 | 7 minutes |
| 0.5 | 3 | 7 minutes |
| 1.0 | 3 | 2.1 minutes |

A plurality of the same type cells was encased in an insulated outer jacket and conductive circular discs as shown in FIG. 5. The average time for the cells in each lot to show external leakage following venting under abusive testing by charging the cells under various currents is shown in Table II:

TABLE II

| Charge Current (ampere) | No. of cells/Lot tested | *Average time (minutes) |
| --- | --- | --- |
| 0.1 | 3 | — |
| 0.25 | 3 | 21.7 |
| 0.5 | 5 | 13.8 |
| 1.0 | 4 | 5.0 |

*Average time that external leakage was observed in each cell lot.

In each of the cells tested, the external housing remained intact without effectively distorting its overall external configuration.

It is to be understood that other modifications and changes to the preferred embodiment of the invention herein shown and described can also be made without departing from the spirit and scope of the invention.

What is claimed is:

1. In a cylindrical galvanic cell comprising a container having an open end and an inner disposed active anode, an active cathode, and an electrolyte disposed within said container; a closure means for the container, said closure means comprising an annular rigid cover disposed within a first annular di-electric gasket having a U-shaped type cross section with the center of the di-electric gasket defining an opening;

a current collector disposed through the central opening in the first di-electric gasket and contacting an active member of the cell; the container having a segment of its upper wall radially compressed against said cover via said first di-electric gasket providing a seal thereat;

the improvement wherein a first arc portion between about 150° and 200° of the top peripheral edge of the container defining the open end is curled over the first di-electric gasket thereby axially securing the closure means at said first arc portion within the container; and wherein at least one vent opening is disposed in the first di-electric gasket below the cover to enable the cover to tip upwardly at the remaining second arc portion of the top of the container after internal gas has reached a predetermined pressure level thereby venting gas between the cover and the first gasket.

2. The cylindrical galvanic cell of claim 1 wherein the second arc portion is slightly curled over the first gasket by an amount insufficient to obstruct the cover from tipping upwardly at said second arc portion of the top of the container.

3. The cylindrical galvanic cell of claim 1 encased in a housing comprising an insulating tubular sleeve enclosing the container and closure means and being axially longer than the container and closure means; a first circular conductive member electronically contacting the bottom of the container and whereby the bottom peripheral edge of the sleeve is curled over said first conductive member thereby adapting said first conductive member as a first terminal of the cell; a second di-electric gasket disposed on the top edge of the container at the open end; a second circular conductive member electronically contacting the current collector and insulated from the container by said second di-electric gasket and whereby the top peripheral edge of the sleeve is curled over said second conductive member thereby adapting said second conductive member as a second terminal of the cell and wherein the second gasket is disposed over the first gasket by an amount sufficient to enable the cover to tip upwardly at the remaining second arc portion of the top of the container after internal gas has reached a predetermined pressure level thereby venting gas between the cover and the first gasket.

4. In the cylindrical galvanic cell of claim 1 wherein the first arc portion is between about 170° and about 180°.

5. In the cylindrical galvanic cell of claim 3 wherein the first arc portion is between about 170° and about 180°.

6. In the cylindrical galvanic cell of claim 1 wherein the first arc portion is about 180°.

7. In the cylindrical galvanic cell of claim 3 wherein the first arc portion is about 180°.

8. In the cylindrical galvanic cell of claim 3 wherein the second arc portion of the container is curled over the first di-electric gasket while not overlapping the cover disposed proximal the second arc portion.

9. In the cylindrical galvanic cell of claim 1, 2, 3 or 8 wherein the cathode is manganese dioxide, the anode is zinc and the electrolyte is aqueous potassium hydroxide.

* * * * *